Aug. 31, 1965

B. VER NOOY 3,203,664

PIVOTED GATE VALVE

Filed March 12, 1962

Burton Ver Nooy
INVENTOR.

BY Browning, Simms,
Hyer & Eickenroht

ATTORNEYS

Aug. 31, 1965 B. VER NOOY 3,203,664
PIVOTED GATE VALVE
Filed March 12, 1962 2 Sheets-Sheet 2
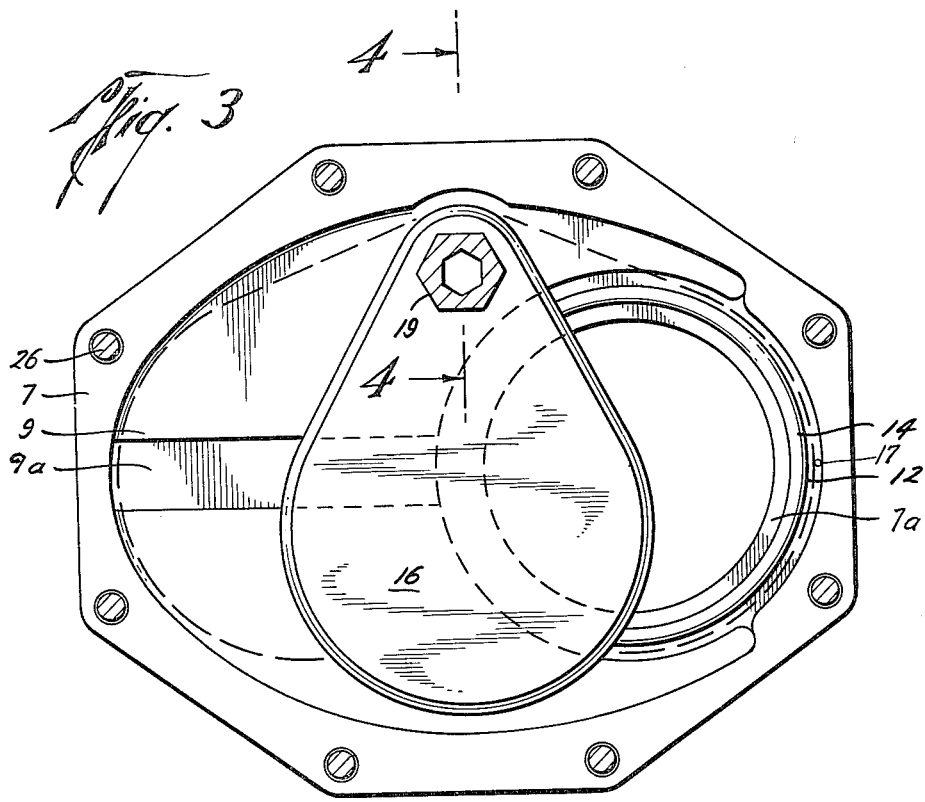
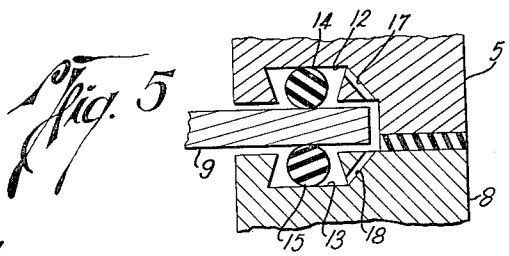
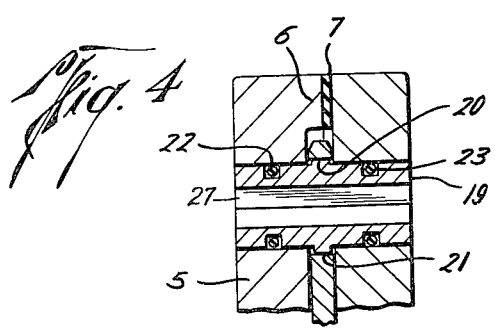
Burton Ver Nooy
INVENTOR.
BY Browning, Simms
Hyer & Eisenraht
ATTORNEYS

United States Patent Office 3,203,664
Patented Aug. 31, 1965

3,203,664
PIVOTED GATE VALVE
Burton Ver Nooy, Tulsa, Okla., assignor to
T. D. Williamson, Inc., Tulsa, Okla.
Filed Mar. 12, 1962, Ser. No. 178,818
3 Claims. (Cl. 251—302)

This invention relates to improved valves of the type in which a flat closure member is movable within a valve body to and from a position closing a flowway through the valve. Valves of the present invention are particularly useful as shutoff valves in municipal water and gas distribution systems but they are not limited to such use.

There is a constant demand for shutoff valves in which efficiency and dependability are combined with low cost and ease of repair. Accordingly, it is an object of this invention to provide a valve in which efficiency and dependability are combined with low manufacturing cost, and in which repairs may be made easily by unskilled workmen using a minimum of equipment.

Another object is to provide a valve which may be manufactured with little machine work and in which close manufacturing tolerances are not required.

Another object is to provide a valve of the above type in which the valve closure may move through a limited distance toward a valve seat in response to pressure of fluid in the valve.

Another object is to provide a valve of the above type in which the valve closure member is carried upon and is responsive to rotation of a pressure-balanced rotatable shaft.

Another object is to provide a valve of this type in which sealing members cannot be forced out of position in retaining grooves by a decrease in pressure within the valve body.

Another object is to provide a valve having all of the above features combined with means for self lubrication and having a socket in the body to receive a bar serving as a wrench to screw the valve onto threaded pipe.

Other objects, advantages and features of this invention will be apparent to one skilled in the art upon consideration of the written specification, the attached claims and the annexed drawings.

In the valve of the present invention, a housing is provided which includes a pair of spaced side plates having flat parallel surfaces defining sides of a cavity within the housing.

The plates preferably are formed by casting and may have suitable external stiffening ribs for additional strength as may be required. A suitable spacing member is provided around the periphery of the plates defining the remaining sides of the cavity within the housing. This spacing member may be constructed as a separate ring like member if desired but, preferably it is merely a raised rim or rims on one or both of the plates formed integral therewith, so that only one annular gasket is required for sealing the cavity within the housing. Suitable means for holding the housing together are provided, preferably a series of bolts or similar retaining members, extending through matching openings in the side plates and spacing member located near the periphery of the housing.

Opposed openings are provided in the plates so that these openings cooperate with the cavity to form a flowway through the housing. Suitable means, such as threads or flanges, for attaching pipe to the housing in cooperating relationship to the flowway also are provided. An annular groove is provided in the inner surface of each of the flat spaced plates spaced from and surrounding each of the openings and these grooves function as retaining grooves for annular seals which are disposed around the flowway. A flat closure member is carried by the rotatable shaft and responsive to rotation thereof to move between a position across the flowway and a second position in the valve body completely opening the flowway. The valve closure member may be positioned at any point within this range by suitable manipulation of the rotatable shaft by suitable means outside the housing.

The rotatable shaft carries a pair of seals in position to seal between the shaft and a corresponding side plate of the housing on each end of the shaft. The shaft itself is disposed perpendicular to the flat faces of the side plates which define sides of the cavity. These seals are of equal size and preferably are installed in matching grooves in the rotatable shaft and in the corresponding side plate of the body so that pressure from fluid within the body cavity exerted upon these seals is balanced and there is no tendency to force the shaft in either longitudinal direction.

The valve closure member is free floating on the shaft in longitudinal direction. This free-floating feature preferably is obtained by making a central part of the shaft which is normally within the body cavity of non-circular cross section, preferably either square or hexagonal, and providing a suitable matching opening in the valve closure member which fits loosely upon the shaft. It will be seen that with this arrangement, when the valve closure member is moved to a position closing the flowway through the valve, pressure behind the valve closure member will force the member toward the valve seat through a small distance after the valve closure member makes initial sealing contact with the downstream seal, thus increasing the sealing pressure. Provision of a seal behind the valve closure member prevents leaking in case the direction of pressure from fluid in the valve body should be reversed.

The longitudinal free-floating arrangement of the closure member on the shaft and the location of sealing members as described above eliminates much machine work in the manufacture of the valve. Only the downstream side of the closure member and a ring on the upstream side thereof in position to contact the upstream seal need be machined smoothly.

Since valves of this type are frequently subject to reduced pressure on one side or the other of the valve closure member, means are provided for preventing the seals from being forced out of the retaining groove. At least one small opening is drilled from the bottom of the retaining groove to the inner surface of the plate in position to release pressure from behind the sealing member into the portion of the cavity removed from the flowway to prevent fluid under pressure from being trapped at this location and forcing the seal out of the groove on reduction in pressure. The grooves themselves preferably taper toward the interior of the valve and the sealing members, which preferably are O-ring seals, are of such cross section that they fit tightly in these grooves and protrude slightly from the converging lips of the groove. This construction provides for an initial seal whenever the valve closure member is moved into position across the flowway.

Details of the construction of this valve may be best understood from consideration of the following detailed description and the attached drawings wherein like reference numerals are used throughout to designate like parts:

FIG. 3 is a section through the valve of FIG. 2 on the line 3—3;

FIG. 4 is a detail of the rotatable shaft carrying the valve closure member; and FIG. 5 is an enlarged view of the vented O-ring grooves shown in FIG. 2 to better illustrate the location of the vent holes with respect to the grooves and the O-rings.

Figure 1:
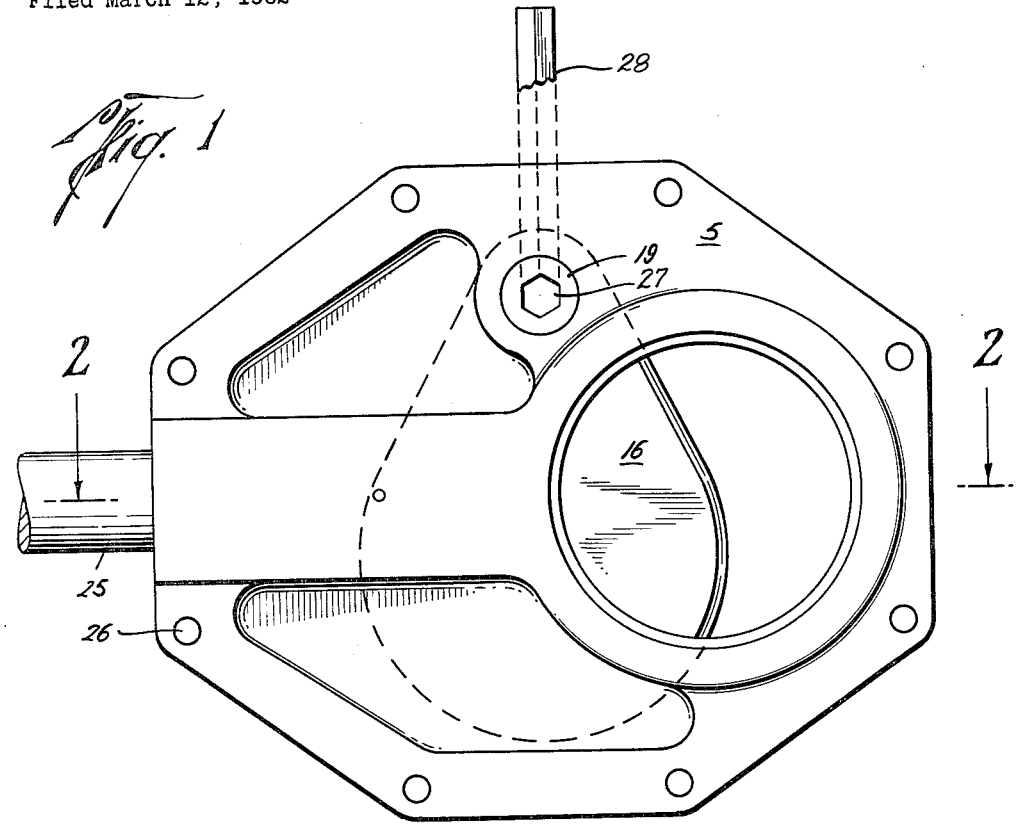
FIG. 1 is a plan of the valve constructed according to principles of the present invention.
Figure 2:
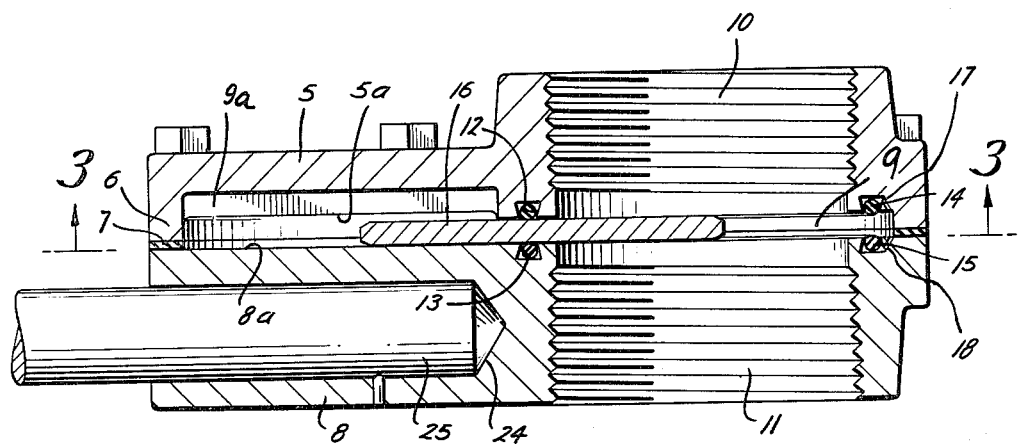
FIG. 2 is a section through the valve of FIG. 1 on the line 2—2.

In FIG. 1, the reference numeral 5 designates a side plate which preferably is of cast construction with a rim 6 around its interior. The rim 6 cooperates with a gasket 7 in spacing side plate 5 from a matching side plate 8 to form the valve housing. The plates 5 and 8 each have opposed flat parallel surfaces 5a and 8a, respectively, which define sides of a cavity 9 within the housing. A grease reservoir 9a, formed as a recess in the downstream side plate, preferably is provided so that the closure member is lubricated each time it is moved between open and closed position, thus providing increased ease of operation and decreased wear. The plates also have opposed openings 10 and 11 which cooperate with cavity 9 to form a flowway through the valve. Grooves 12 and 13 are arranged in plates 5 and 8, respectively, to surround the corresponding openings. These grooves preferably are tapered toward the interior of the body and serve as retaining grooves for seals 14 and 15, respectively. The seals preferably are O-rings of such cross section as to fit tightly within the corresponding grooves and to protrude slightly therefrom to form an initial seal with a flat, pivoted valve closure member 16 when the latter is moved to a position across the flowway.

The grooves are located in annular smoothly finished sections 7a (FIG. 3) surrounding the flowway. These annular sections are the only part of the interior of the valve housing that need to be smoothly finished to cooperate with closure member 16 and seals 14 and 15 to provide a fluid tight valve.

At least one small opening, 17 and 18, is drilled in each of the plates 5 and 8 to vent an inner part of grooves 12 and 13, respectively, to the cavity 9 inside the valve. This arrangement prevents fluid under pressure in an inner part of the retaining grooves from forcing seal 14 or 15 out of its corresponding groove when pressure is reduced within the valve body.

The valve closure member 16 is movable in response to rotation of a rotatable shaft 19 (best shown in FIG. 4) between limiting positions indicated by broken lines in FIG. 3, and has an opening 20 therein loosely fitting upon shaft 19. This opening 20 and a corresponding central shoulder 21 on shaft 19 are of matching non-circular shape, preferably either square or hexagonal. The loose fit of the opening 20 upon shoulder 21 permits movement of the closure member 16 on shaft 19 in a direction parallel to the axis of the shaft. The shaft itself is pressure balanced by the provision of a pair of annular seals 22 disposed in grooves 23 in shaft 19 on opposite sides of the body cavity. Balanced pressure upon these seals of equal area prevents binding of the valve when fluid is under high pressure in the body of the valve.

Plate 8 preferably is provided with a socket 24 to receive a bar type handle 25 for screwing the valve onto threaded pipe sections having threads matching threads in openings 10. The bar handle is preferred because this particular valve preferably is used with a series of fittings operable by a single bar type handle to minimize the number of tools required for assembly of valved lines.

The shaft 19 has a non-circular depression 27 in an end where it is substantially flush with the exterior of the valve body. This depression is cooperable with means for rotating the shaft from the exterior of the body illustrated as an Allen wrench 28 having a hexagonal cross section fitting the cavity. The plates 5 and 8 are held together by a series of bolts 26 extending through matching openings therein and through matching openings in gasket 7. Thus, the valve is very easily disassembled and a new valve closure member or new seals may easily be inserted by an unskilled workman in a minimum of time.

While this valve is intended principally for cut-off use, it can be used as a throttle valve, especially for short times, as the construction shown provides a valve in which the valve closure member may be stopped at any point between the two positions given above.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve comprising, in combination, a housing including two plates having opposed flat parallel surfaces defining sides of a cavity within the housing; opposed flow openings in each plate combining with the cavity to provide a flowway through the housing; opposed annular grooves in each plate around and spaced from the flow openings; a rotatable shaft extending across said cavity and through openings in the two flat plates and exposed to pressure in said cavity; means for sealing between the shaft and each plate, the sealing means encompassing equal cross-sectional areas to balance out the effect of fluid pressure in the cavity on the shaft, the shaft having a noncircular portion between the plates; a flat plate valve closure member mounted on the shaft and having a noncircular opening engaging the noncircular portion of the shaft to prevent relative rotation between the closure member and the shaft and to allow relative longitudinal movement between the closure member and the shaft, the closure member being rotatable by the shaft from a first position across the flow openings to a second position out of alignment with the flow openings, an annular O-ring type seal in each of said grooves and being of sufficient cross-sectional area relative to the depth of the groove to engage an inner wall of the groove and to extend from the groove to engage a side of the closure member when the latter is in said first position, the closure member being of sufficient thickness to engage both of said annular seals on opposite sides of the closure member when in said first position, said closure member being free to be moved longitudinally into sealing engagement with the downstream annular seal by line pressure.

2. A valve comprising in combination a housing including a pair of side plates having opposed flat parallel surfaces defining sides of a cavity within the housing, said plates having opposed openings therethrough cooperative with the cavity to form a flowway through the housing; an annular groove in each of the flat surfaces on the side plates around and spaced from a corresponding one of said openings; a rotatable shaft extending through openings in each of the side plates perpendicular to the flat opposed surfaces and exposed to pressure within said cavity; means for sealing between the shaft and each plate, the sealing means encompassing equal cross-sectional areas to balance out the effect of cavity pressure on the shaft; a flat valve closure member mounted on said shaft to rotate with the shaft between a first position across said openings closing said flowway and a second position in the cavity opening the flowway; an annular O-ring type seal in each of said grooves and being of sufficient cross-sectional area relative to the depth of the groove to engage an inner wall of then groove ad to extend from the groove to engage a side of the closure member when the latter is in said first position, the closure member being of sufficient thickness to engage both of said annular seals, on opposite sides of the closure member when in said first position, the valve closure member being slidable longitudinally on the shaft to allow line pressure to move the valve closure member longitudinally into sealing engagement with the annular seal located downstream of the valve closure member; and externally operable means for rotating the shaft.

3. A valve comprising in combination a housing including a pair of side plates having opposed flat parallel surfaces defining sides of a cavity within the housing, said plates having opposed openings therethrough cooperative with the cavity to form a flowway through the housing; an annular groove in each of the flat surfaces on the side plates around and spaced from a corresponding one of said openings; an annular sealing ring in each of said grooves, said annular grooves having walls converging toward the interior of the valve with an opening through the wall of each groove venting the side of the groove away from the flowway to prevent line pressure from building up under the upstream seal ring when it is not in sealing engagement with a closing member; a rotatable shaft mounted in the side plates perpendicular to the flat opposed surfaces; means for sealing between the shaft and each plate, the sealing means encompassing equal cross sectional areas of the shaft to balance out the effect of line pressure; a flat valve closure member mounted on said shaft to rotate with the shaft between a first position across said openings closing said flowway and a second position in the cavity opening the flowway, the valve closure member being slidable longitudinally on the shaft to allow line pressure to move the valve closure member longitudinally into sealing engagement with the annular seal located downstream of the valve closure member; and externally operable means or locating the shaft.

References Cited by the Examiner

UNITED STATES PATENTS

| | | | |
|---|---|---|---|
| 1,874,627 | 8/32 | Riley | 137—246.22 |
| 2,713,989 | 7/55 | Bryant. | |
| 2,781,787 | 2/57 | Johnson | 251—302 XR |
| 2,842,153 | 7/58 | Volpin | 137—246.12 |
| 3,044,741 | 7/62 | Grove | 251—328 XR |

FOREIGN PATENTS

| | | |
|---|---|---|
| 600,093 | 1/26 | France. |
| 1,053,141 | 9/53 | France. |
| 1,128,725 | 8/56 | France. |
| 1,137,071 | 1/57 | France. |
| 671,546 | 5/52 | Great Britain. |

ISADOR WEIL, *Primary Examiner.*

M. CARY NELSON, *Examiner.*